United States Patent Office 2,787,060
Patented Apr. 2, 1957

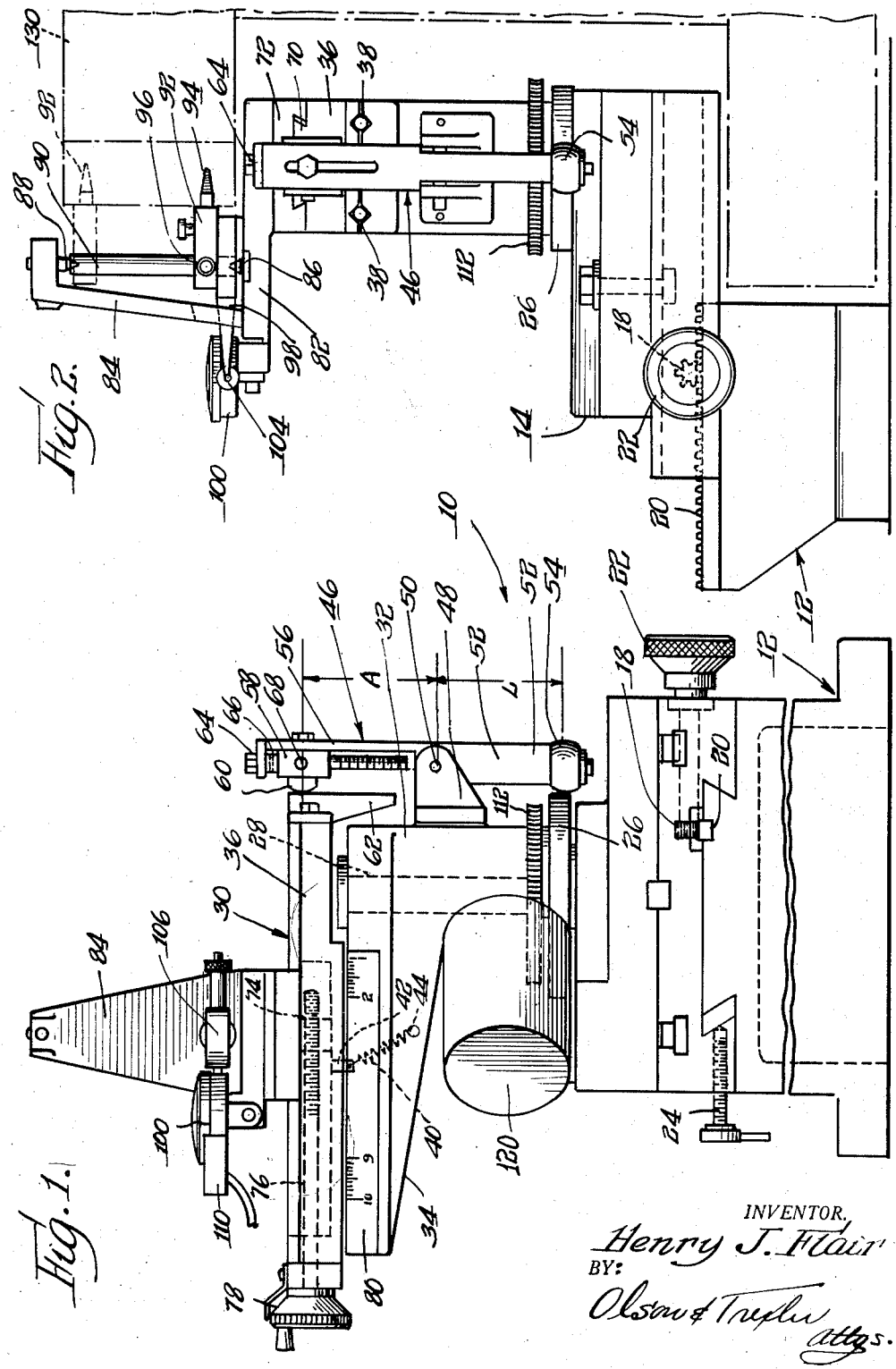

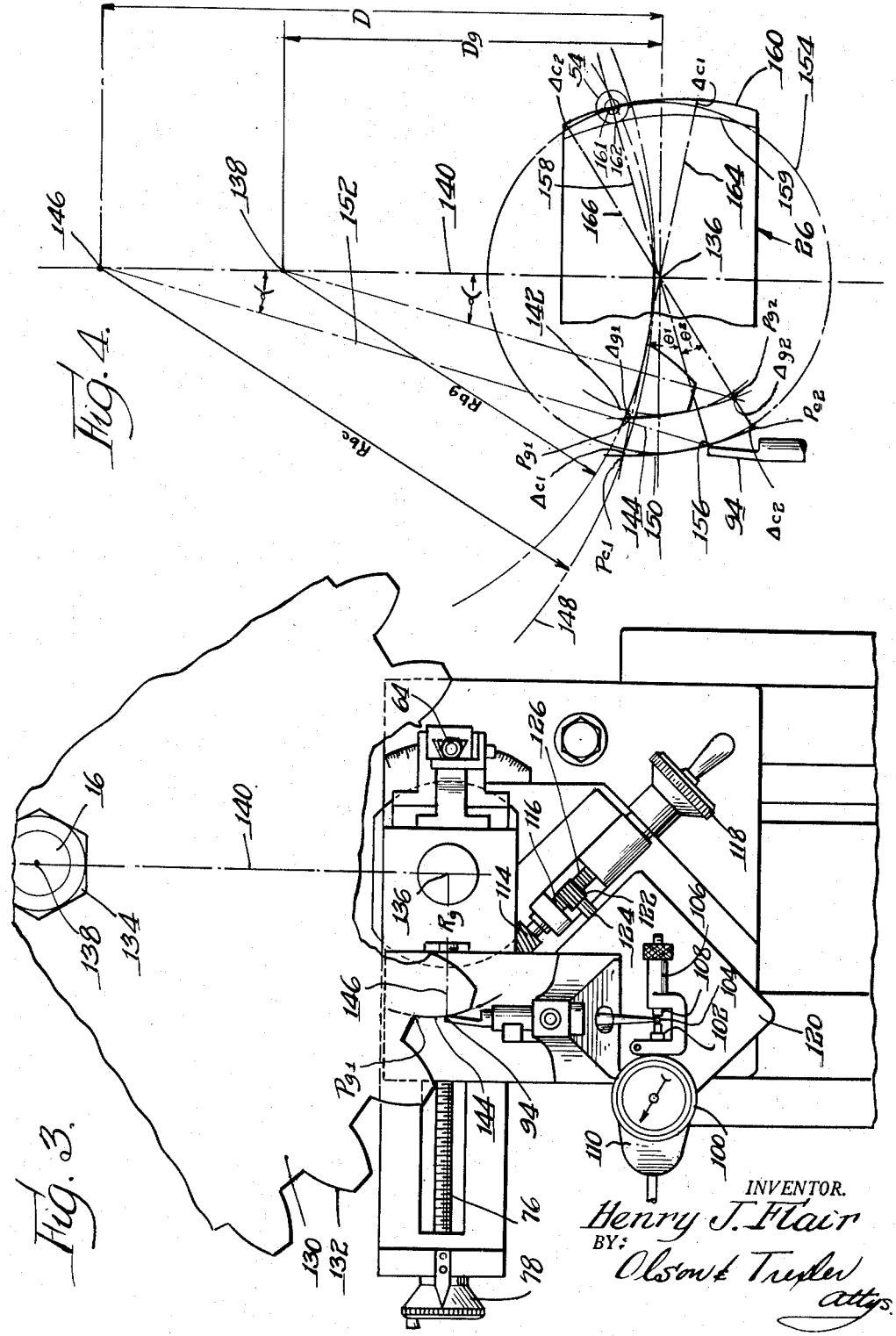

2,787,060

PROFILE CHECKING MACHINE

Henry J. Flair, Chicago, Ill., assignor to Illinois Tool Works, Chicago, Ill., a corporation of Illinois Application October 25, 1954, Serial No. 464,279

10 Claims. (Cl. 33—179.5)

The present invention relates to a novel mechanism for checking profiles of workpieces and more particularly, to a novel mechanism especially adapted for checking profiles of gear teeth and the like.

Mechanisms have heretofore been devised which include a pair of inspecting fingers for checking gear teeth profiles, one of which fingers is adapted to contact a master cam or gear and the other of which fingers is adapted to contact the workpiece gear. In such heretofore known mechanisms, it has been necessary to provide a different master gear or cam for each size of workpiece gear to be checked. It is a primary purpose of the present invention to provide a novel mechanism wherein only one master cam need be provided for checking a plurality of gears and the like having different diameters.

More specifically, it is an object of the present invention to provide a novel mechanism which is capable of moving a workpiece contacting or inspecting finger so that it traces a family of geometrically proportional curves from one master cam.

Still another object of the present invention is to provide a novel mechanism of the above described type which is constructed so that a plurality of master cams may be interchanged to adapt the mechanism to trace different families of geometrically proportional curves.

A further object of the present invention is to provide a novel mechanism of the above described type which is of relatively simple construction so that it may be easily produced and operated.

Other objects and advantages of the present invention will become apparent from the following description and the accompanying drawings wherein:

Fig. 1 is an elevational view of a mechanism embodying the principles of this invention with certain elements omitted for clarity;

Fig. 2 is a fragmentary side elevational view of a mechanism incorporating the features of this invention with certain elements omitted for clarity;

Fig. 3 is a fragmentary plan view of the novel mechanism of this invention; and

Fig. 4 is a diagrammatic plan view illustrating the theory of operation of the novel mechanism.

Referring now more specifically to the drawings wherein like parts are designated by the same numerals throughout the various figures, a mechanism 10 is shown in the drawings for the purpose of illustrating the present invention and includes a base 12. A dovetail carriage 14 is slidably mounted on the base and may be adjusted toward and away from a workpiece or gear locating shaft 16 by means of a gear 18 cooperating with a fixed rack 20 and turned by hand knob 22. The carriage may be locked in any desired adjusted position by means of a set screw 24. Fixed on top of said carriage by suitable means such as screws, not shown, is a master cam 26 which will be described in detail hereinbelow, and a shaft 28 is fixed to the carriage and extends upwardly therefrom for pivotally supporting a checking head 30.

The checking head 30 includes a column 32 that is rotatably supported by the shaft 28. The column 32 is provided with a lateral extension 34 for slidably supporting a slide member 36. Preferably, the slide member and the rotating column are provided with cooperating ball races in which a plurality of ball bearings 38 are disposed so that the slide may move without substantial frictional resistance. The slide is resiliently urged toward the right as viewed in Fig. 1 by suitable spring means such as a tension spring 40 connected between the pin 42 fixed to the slide and a pin 44 fixed to the rotating column. Movement of the slide toward the right is limited by lever means 46 which is mounted on the rotating column by means of a bracket 48 fixed to the column and a pivot pin 50 extending through the bracket and the lever means. The lower arm 52 of the lever means rotatably carries a roller 54 which engages the master cam 26 to limit pivotal movement of the lever means in a clockwise direction as viewed in Fig. 1. The upper arm 56 of the lever means carries a slide block 58 having an abutment 60 disposed for engagement with the end of the slide 36. The block 58 may be adjusted along the length of the lever arm 56 to vary the effective length of this lever arm, and the slide 36 is provided with a depending abutment portion 62 which is adapted to cooperate with the abutment 60 regardless of the position to which the block 58 may be adjusted. The block 58 may be adjusted by means of an elongated screw member 64 extending through an aperture in the upper end of the lever arm 56 and threaded through an aperture in the block. A collar 66 is pinned or otherwise secured to the screw member beneath the upper end portion of the lever arm so as to prevent axial movement of the screw member relative to the lever arm. Thus, upon rotation of the screw member, the block will be advanced along the lever arm. A set screw 68 is provided for locking the block in any desired adjusted position.

The upper surface of the slide member 36 is provided with a dovetail guide 70 for mounting a slide member 72 for adjustment longitudinally of the slide member 36. In order to adjust the slide member 72, a nut member 74 depends therefrom into a suitable slot in the slide 36 and an elongated screw member 76 extends through the slot and is threaded through the nut member 74. A hand wheel 78 is fixed to the outer end of the screw member 76 so that upon turning thereof, the slide member 72 may be moved along the slide 36. Conveniently, a scale 80 may be provided along the side of the rotatable column 32 for indicating the position to which the slide member 72 has been adjusted.

The slide member 72 is provided with a laterally extending platform portion 82 from which extends an upstanding pedestal 84. Opposing centers 86 and 88 are mounted on the platform portion 82 and upstanding pedestal 84, respectively, for rotatably supporting a shaft 90. A workpiece inspecting finger 92 is mounted on the shaft 90 for presenting a tip 94 thereof for engagement with a tooth of a workpiece gear or the like. Preferably, the inspecting finger is slidably mounted on the shaft 90 so that it may be adjusted to any desired position such as the position partially indicated in broken lines in Fig. 2 for checking any desired part of a tooth profile. A set screw 96 is provided for locking the inspecting finger in the desired adjusted position. A second finger 98 is fixed on the shaft 90 and extends generally oppositely from the finger 92. Thus, the inspecting finger 92 and the finger 98 combine to provide lever means adapted to actuate means for indicating the results of the checking operation.

The indicating means includes a dial indicator 100 of known construction which is suitably fixed on the platform portion 82 of the carriage member 72. The dial indicator includes a spring biased plunger 102 which engages the tip 104 of the finger member 98 and yieldably biases the finger in a counterclockwise direction as viewed in Fig. 3. A bracket 106 of known construction is mounted on the dial indicator and carries a second spring biased plunger 108 disposed to oppose the action of the plunger 102 and yieldably bias the finger member 98 in a clockwise direction. As will be understood, the plungers 102 and 108 and the dial indicator are initially adjusted so that the pointer of the dial indicates a reading of zero. An electrical pick-up head 110 which includes a differential transformer of known construction is mounted on the back of the dial indicator and is actuated by the plunger 102. This electrical pick-up head serves to energize a mechanism, not shown, for recording the results of the checking operation. Such recording mechanisms are well known and need not be set forth in detail.

In order to rotate the column 32 during the checking operation, a worm gear 112 is fixed thereto and meshes with a worm 114 which is rotatably supported by a suitable bearing and bracket means 116 on the carriage 14. A hand wheel 118 is fixed to the worm shaft for rotating the worm and thus, the column 32. In addition, a Selsyn transmitter motor 120 of known construction is mounted on the carriage 14 and is rotated by means of a worm gear 122 fixed on its shaft 124 and meshing with a worm 126 mounted on the shaft of the worm 114. Thus, the Selsyn motor is rotated in accordance with the rotation of the column 32. The Selsyn motor 120 serves to operate a Selsyn receiving motor, not shown, which receiving motor, in turn, serves to operate the paper drive of a recording mechanism, not shown.

A workpiece gear 130 having teeth 132 is checked in the following manner. The gear is placed on the shaft 16 and is locked against rotation by a nut 134 or by any other suitable means such as dowel pins, not shown, extending between the gear and the base of the apparatus. The carriage 14 is adjusted along the base to locate the center 136 of the rotating head supporting shaft a predetermined distance from the center 138 of the shaft 16 along a common center line 140. The slide member 72 is adjusted along the slide 36 to position the tip 94 of the inspecting finger from the center 136 a predetermined radius $R_g$. The arm 52 of the lever 46 has a fixed length L and the effective length A of the lever arm 56 is adjusted in the manner set forth below so that A/L equals a predetermined ratio.

After all of the adjustments have been made, the hand wheel 118 is turned so that the column 32 is rotated to move the tip 94 along an arc of a circle 142 having the radius $R_g$. Preferably, $R_g$ is set so that the circle intersects and approximates the segment of the curve or profile to be checked such as the involute profile of the tooth 146 which is disposed between points $P_{g1}$ and $P_{g2}$ on an involute curve 144. At the same time, the cam follower 54 on the lever arm moves along the master cam 26, which cam is formed so as to cause the lever means 46 to pivot and, thus, the slide 36 to shift radially of the center 136 a predetermined amount for each segment or degree of circular movement of the inspecting finger. The cam is formed so that the combined circular and radial movement imparted to the inspecting finger is such that the tip 94 defines or traces the master or theoretical profile or curve of the tooth being checked. The indicating mechanism, of course, is first set so that the tip 94 is resiliently pressed against the tooth surface. Thus, any errors in the tooth profile will permit the tip to deviate from the theoretical or master curve, and this deviation will be shown on the dial and on the recording mechanism.

The manner in which the master cam is formed and the checking head is positioned and adjusted is conveniently based on the angular coordinate method of tracing curves and is shown in Figs. 3 and 4. In order to simplify the structure, the master cam 26 is formed so that lengths A and L of the lever arms are equal when the apparatus is set to check the largest diameter gear which may be placed thereon. To accomplish this, a point 146 is located on the center line 140 and a circle 148 with a radius $R_{bc}$ is drawn having the point 146 as its center. The circle 148 is the base circle of the largest gear to be checked and/or the base circles of a theoretical cam designed to cause the finger tip 94 to trace the largest curve 150 to be checked. Thus, $R_{bc}$ is the radius of this theoretical cam. For the purpose of illustrating the present invention, the curve is shown in the form of an involute, but it should be understood that the same principles may be applied for making a master cam and adapting the apparatus to check other geometrical proportional curves such as epicycloid, hypocycloid, spiral of Archimedes, logarithmic spiral, cardioid and parabola.

From the point 146, a line 152 is drawn at an angle $\alpha$ from the center line 140. This angle may be of any desired size within practical limits but is preferably similar to the pressure angle of the gear teeth. Thus, when a standard 20° involute tooth form is to be checked, $\alpha$ should be about 20°, as shown. The center 136 may be located at various points along the center line 140. However, the point 136 which is also the center of the base circle 154 of the master cam 26 is preferably located so that the base circle 154 will most closely approximate the curve 150 whereby forming and machining of the cam is simplified. It has been found that the optimum distance D between the points 136 and 146 may be expressed by the equation $D = (\sec. \alpha) R_{bc}$.

The line 152 intersects the curve 150 at a point 156 and by locating the center 136 in the manner described above, the radius $R_c$ of the cam 26 base circle 154 is determined by a line 158 extending between the points 156 and 136. It is seen that starting from the point 156, the curve deviates from the base circle 154 a given amount for each increment of rotation about the center 136 so that the deviation at $P_{c1}$ is $\Delta 1$ and at $P_{c2}$ is $\Delta 2$. Thus, the surface of the cam 26, the approximate shape of which is shown by line 159, must deviate from the base circle 154 so that the center 161 of the roller 54 traces a curve 160 which varies from the base circle 154 proportional amounts whereby the lever means 46 is actuated to move the slide 36 radially of the point 136 and offset the finger tip 94 a predetermined amount from the circle 154 in order to trace the curve 150. More specifically, at the point 162 where the line 158 intersects the circle 154 oppositely from the point 156, the deviation of the curve 160 from the circle 154 is zero. With the lever means 46 adjusted so that A equals L, the deviation of the curve 160 is equal to $\Delta_{c1}$ where it is intersected by a line 164 extending through $P_{c1}$ and point 136. Similarly, the deviation of the curve 160 is equal to $\Delta_{c2}$ where it is intersected by line 166 extending through $P_{c2}$ and point 136.

The deviation $\Delta$ of the curve 150 or the cam curve 160 from the base circle 154 for any angle $\theta$ of rotation about the point 136 from the line 158 may be expressed by the equation $\Delta = R_{bc} f(\theta)$ where the function of the angle may be determined by known mathematical methods. Thus, in the illustration of Fig. 4, $\Delta_{c_2} = R_{bc} f(\theta)$.

As set forth hereinabove, the same master cam can be used for checking different sizes of curves in a family of geometrically proportional curves. To accomplish this when checking a tooth profile falling in the curve 144 of the gear 130 having a base circle radius $R_{bg}$, the mechanism is adjusted so that the distance $D_g$ between points 136 and 138 is equal to $(\sec. \alpha) R_{bg}$. The lever means 46 is adjusted so the $$A = L\left(\frac{R_{bg}}{R_{bc}}\right)$$

The radius $R_g$ of the arc along which the finger tip 94 moves is adjusted so that $$R_g = R_c \left( \frac{R_{bg}}{R_{bc}} \right)$$

Thus, the deviation $\Delta$ of the curve 144 from the circle 142 may be expressed as $\Delta = R_{bg} f(\theta)$, whereby at point $P_{g1}$, $$\Delta_{g1} = R_{bg} f(\theta_1), \text{ or } \Delta_{g1} = \left( \frac{R_{bg}}{R_{bc}} \right) \Delta_{c1}$$

and at point $P_{g2}$, $$\Delta_{g2} = R_{bg} f(\theta_2) \text{ or } \Delta_{g2} = \left( \frac{R_{bg}}{R_{bc}} \right) \Delta_{c2}$$

It is, of course, understood that after each tooth has been checked, the gear will be rotated to position the next tooth for engagement with the inspecting finger. The mechanism of the present invention has been illustrated in position to check only one flank of the workpiece teeth. To check the other flanks of the teeth, it is merely necessary to reverse the position of the slide member 77 on the slide 36 and to rotate the column 32 180° from the position shown. The master cam 26 is also provided with a second surface similar to and oppositely disposed from the surface 159.

From the above description, it is seen that the present invention has provided a novel mechanism whereby a single master cam may be used for checking curves of different sizes in a family of geometrically proportional curves. Since the workpiece gear remains stationary during the checking operation of each tooth, the mechanism is particularly useful for checking large diameter gears which may be heavy and relatively difficult to turn and stop in a precise manner. Furthermore, the base of the apparatus disclosed may be the base of a known machine such as a hobbing or shaving machine, and the carriage 14 and checking head 30 may be carried to and mounted on the base when needed. This eliminates the need for transporting the gear to the checking mechanism which would be relatively difficult if the gears were very large.

While the preferred form of the present invention has been shown and described herein, it is obvious that many structural details may be changed without departing from the spirit and scope of the appended claims.

The invention is claimed as follows:

1. An apparatus for checking various geometrically proportional profiles of workpieces such as gears comprising an inspecting member mounted for movement along an arc having a center spaced from a center of a workpiece to be checked and a radius of predetermined length, means for varying the length of said radius a predetermined amount for each increment of movement of said member for causing said member to define substantially a theoretical profile of a workpiece being checked, and means for adjusting said last named means to vary the radius length a predetermined different amount for each of said increments of movement for substantially defining a second theoretical profile which is geometrically proportional to the first mentioned theoretical profile.

2. An apparatus for checking geometrically proportional profiles of workpieces such as gears having base circles with different radii comprising an inspecting member mounted for movement along an arc having a fixed center spaced from a center of a workpiece to be checked and a radius of predetermined length, means for varying the length of said radius a predetermined amount for each increment of movement around the fixed center of said arc for causing said member to define substantially a theoretical profile of a workpiece having one radius, and means for adjusting said last named means for varying the length of said arc radius a predetermined different amount for each of said increments of movement for substantially defining a theoretical tooth profile of a second workpiece having a radius of predetermined different length with the proportion of said second amount of variation to said first amount of variation being substantially equal to the proportion of said second workpiece radius to said first workpiece radius.

3. An apparatus for checking geometrically proportional profiles of workpieces such as gears having base circles with different radii comprising a checking member mounted for movement along an arc having a center spaced from the center of a workpiece to be checked and a radius of predetermined length, means including a cam having a base circle substantially concentric with said first mentioned center for varying the length of said radius a predetermined amount for each increment of movement of said member around a fixed center of said arc causing said member to define substantially a theoretical profile of a first workpiece having one radius, and means for adjusting said last named means to vary the length of said arc radius a predetermined different amount for substantially defining a theoretical profile of a second workpiece having a radius of predetermined different length with the proportion of said second amount of variation to said first amount of variation being substantially equal to the proportion of said second workpiece radius to said first workpiece radius.

4. An apparatus for checking geometrically proportional profiles of workpieces such as gears having base circles with different radii comprising a checking member mounted for movement along an arc having a fixed center spaced from a center of a workpiece to be checked and a radius of predetermined length, means including a fixed cam having an axis generally parallel to an axis of said arc and a lever engageable with said cam and movable with said checking member for varying the length of said radius a predetermined amount for each increment of movement of said checking member around the fixed center of said arc for causing said member to define substantially a theoretical profile of a first workpiece having one radius, means for adjusting said lever to vary the length of said arc radius a predetermined different amount for substantially defining a theoretical profile of a second workpiece having a radius of predetermined different length with the proportion of said second amount of variation to said first amount of variation being substantially equal to the proportion of said second workpiece radius to said first workpiece radius.

5. An apparatus for checking tooth profiles of gears and the like comprising checking head means mounted for rotation about a center spaced a predetermined distance from the center of a gear to be checked, said head means including a slide mounted for movement radially of said center of rotation, and an inspecting member mounted on said slide with a gear contacting tip disposed a second predetermined distance from said center of rotation, and means for radially shifting said slide during rotation of said head means predetermined amounts in accordance with angles through which the head means is rotated, the combined rotary and radial motion of the inspecting member being such that the tip thereof defines substantially the theoretical profile of the gear being checked.

6. An apparatus for checking tooth profiles of gears and the like comprising a checking member, means mounting said checking member for combined circular and radial motion with respect to a fixed center spaced from a center of a workpiece to be checked, and means for rotating and simultaneously imparting radial movement to said inspecting member for causing said inspecting member to define substantially the theoretical profile of a tooth being checked.

7. An apparatus for checking geometrically proportional tooth profiles of gears and the like, comprising an inspecting member, means mounting said inspecting member for combined rotary and radial movement with respect to a predetermined center spaced from a center of a gear to be checked, means including a cam having a base circle substantially concentric with said first mentioned center and a predetermined arcuate profile and lever means engaging said cam profile and mounted for rotary movement with said first mentioned mounting means for simultaneously imparting rotary and radial movement to said inspecting member for causing said inspecting member to define a theoretical tooth profile of one workpiece, and means for adjusting said lever means to change the radial movement of said inspecting member for causing said inspecting member to define substantially a theoretical tooth profile of a second gear.

8. An apparatus for checking tooth profiles of workpieces such as gears and the like comprising an inspecting member, means supporting said inspecting member for combined rotary and radial movement with respect to a center spaced from the center of a workpiece to be checked and along a curve substantially defining the theoretical profile of a workpiece to be checked, means movably mounting said inspecting member on said supporting means and for yieldably biasing said inspecting member against a workpiece being checked so that any error in the workpiece causes shifting of said inspecting member to indicate the variation of the workpiece profile from the theoretical profile, and means for moving said inspecting member along said curve including a fixed cam having a base circle substantially concentric with said first mentioned center and a generally arcuate profile, and pivotally supported lever means mounted for rotary movement with said first mentioned supporting means and engaging said cam profile.

9. An apparatus for checking a tooth profile of a workpiece such as a gear and the like comprising means for supporting a workpiece at a first center, mounting means rotatable about a second center spaced from said first center and disposed adjacent a periphery of a workpiece to be checked, an inspecting member carried by said mounting means for rotation therewith and for radial movement relative thereto, and means for simultaneously rotating said mounting means and radially shifting said inspecting member for causing the inspecting member substantially to define a theoretical tooth profile of a workpiece, said last named means including a fixed cam substantially concentrically disposed with respect to said rotatable mounting means, and a shiftable member carried by said rotatable mounting means and engaging said cam.

10. In an apparatus for checking tooth profiles of workpieces such as gears and the like, a member rotatable about a predetermined axis, a slide disposed on said member for movement substantially radially of said axis, a workpiece checking element carried by said slide, means for rotating said member, and means including a cam having a base circle substantially concentric with said axis and lever means pivotally mounted on said rotatable member and engaging said cam and said slide for shifting said slide during rotation of said member for moving the checking element substantially to define a theoretical profile of a workpiece tooth.

References Cited in the file of this patent

UNITED STATES PATENTS

| | | |
|---|---|---|
| 1,564,589 | Laesstier | Dec. 8, 1925 |
| 1,858,468 | Simmons | May 17, 1932 |
| 2,564,376 | Schwartz | Aug. 14, 1951 |
| 2,657,469 | Brown | Nov. 3, 1953 |